Feb. 1, 1938. L. A. HAGLER 2,106,925
CIRCUIT CONTROLLER FOR INDICATORS
Filed April 21, 1936
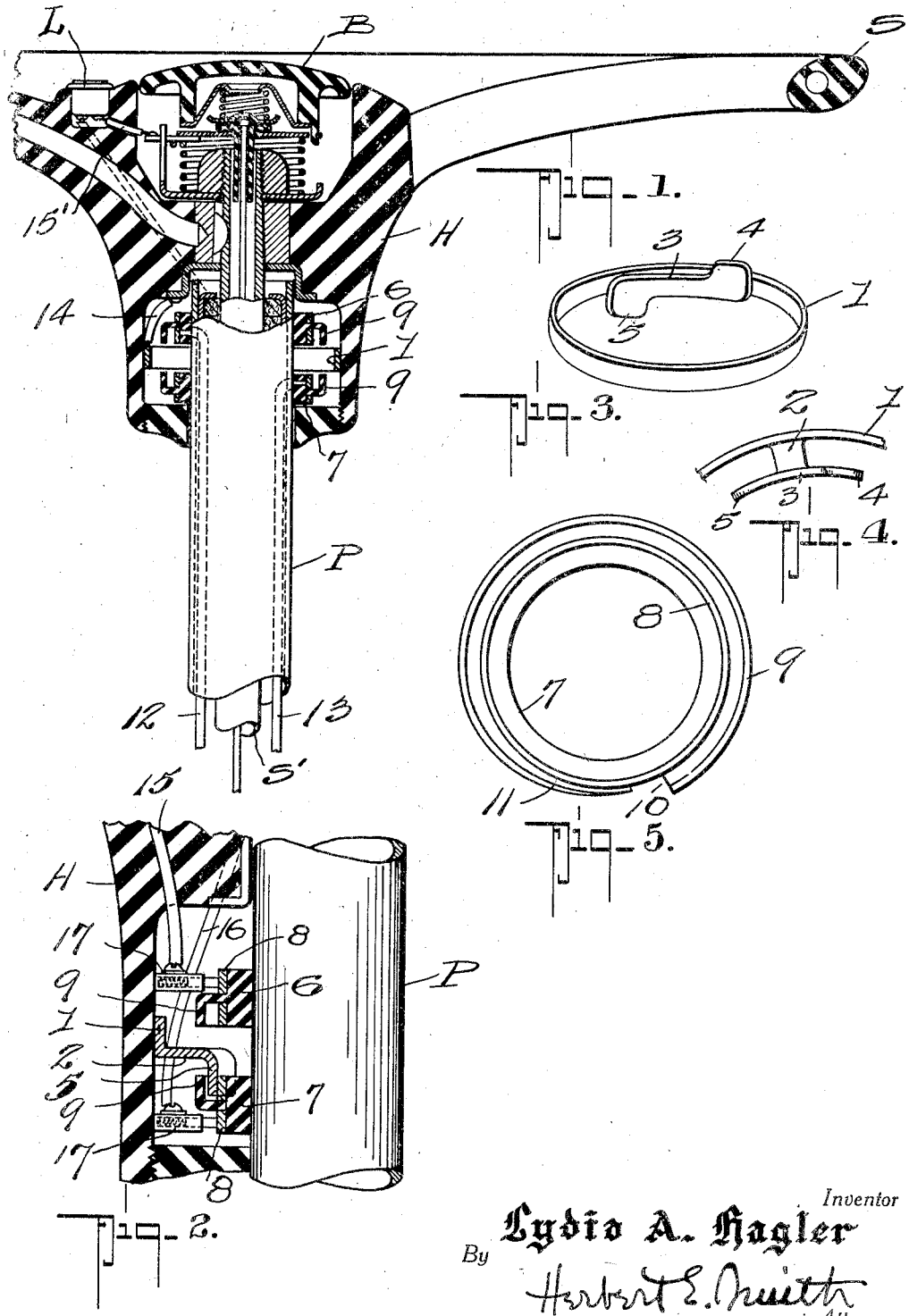
Inventor
Lydia A. Hagler
By Herbert E. Smith
Attorney Patented Feb. 1, 1938

2,106,925

UNITED STATES PATENT OFFICE 2,106,925

CIRCUIT CONTROLLER FOR INDICATORS

Lydia A. Hagler, Otis Orchards, Wash., assignor of one-half to Sidney E. Smith, Opportunity, Wash.

Application April 21, 1936, Serial No. 75,600

2 Claims. (Cl. 200—59)

My present invention relates to improvements in direction indicators of the electrically illuminated type for use on automotive vehicles, and designed especially for the purpose of announcing or indicating left hand and right hand turns to be made by the vehicle so equipped. In carrying out my invention the vehicle is equipped with a front indicator or annunciator as well as a rear annunciator on which are displayed the words LEFT and RIGHT, or the letters R and L, and when illuminated, the annunciator indicates to either or both an approaching motorist or pedestrian, and a following motorist, the intention of the driver of the vehicle to make a selected turn.

In the preferred form of my invention I utilize two selective, manually controlled circuit closers, either one of which may be closed as a pre-warning signal, before the turn of the vehicle is started, and while the vehicle is traveling in a straight lane; and with the turning movement of the vehicle, under the action of the steering wheel, the same signal is illuminated and displayed by the automatic closing of a second circuit closer. Thus, after the manually controlled pre-signal has been announced, the driver of the vehicle is freed of the necessity for using his or her hand to indicate the intended turn, and the direction indicator is automatically illuminated by the turning of the steering wheel. After the steering wheel has been returned to position for straightaway driving of the vehicle, the automatic circuit closer is opened and the electric lamp illuminating the indicator is extinguished, in accord with the turning movement of the steering wheel.

Means are provided in connection with the automatic circuit closers for the annunciators, whereby the usual and ordinary turning movements of the steering wheel while the vehicle is traveling in a generally straight lane, will not effect the closing of the circuit closers; and means are also provided whereby a selected annunciator, only, is illuminated, while the other annunciator remains dark. Thus, it will be understood that if a left hand turn is to be made and the pre-warning signal is given by manually closing the circuit for the lamp of the left hand annunciator; then, when the same circuit is automatically closed, due to turning of the steering wheel, the circuit for the right hand annunciator is not affected. The same conditions are present when the circuit for the right hand annunciator is closed, manually, and then subsequently closed, automatically, the left hand annunciator remaining dark.

The invention consists in certain novel combinations and arrangements of parts involving the use of an annunciator or indicator to be illuminated, two electric lamp circuits for the annunciator, each circuit including a rotary, automatic, circuit-closer, and a manually controlled lamp-switch, and a stationary contact member for co-action with the movable member of the rotary, automatic, circuit closer, together with other combinations as will hereinafter be more fully set forth and claimed.

In the accompanying drawing I have illustrated one complete example of the physical embodiment of my invention wherein the parts are combined and arranged according to one mode I have thus far devised for the practical application of the principles of my invention, but it will be understood that changes and alterations may be made in the exemplifying structures within the scope of my claims, without departing from the principles of my invention.

Figure 1 is a detail sectional view at the hub of the steering wheel of the vehicle, showing the arrangement of the automatic switches or circuit closers, and one of the spring-pressed switch buttons.

Figure 2 is an enlarged detail sectional view showing parts of both the manual control and the automatic control switches for the annunciators or indicators.

Figure 3 is a perspective view of the rotary contact member for the two automatic circuit closers.

Figure 4 is a fragmentary detail, plan view, of the rotary contact member.

Figure 5 is a plan view of one of the duplex stationary contact members for the automatic circuit makers.

For manual control of the signals the switch buttons R and L are mounted on the hub H of the steering wheel S where the buttons are readily accessible for use by the driver of the automobile.

In Figure 1 the spring button B is depressed to sound the horn as usual, and this button is mounted at the center of the hub H, which is shown as an integral part of the steering wheel, and is hollowed and otherwise converted for use in connection with the manually controlled lamp switches and the automatic circuit closers. The wheel S with its spindle S' revolves with relation to the column or post P, as usual, for steering the vehicle in making right hand or left hand turns, and the stationary contact members of the circuit closers are mounted on the stationary, tubular post, while the movable or rotary members of these closers are mounted on the hub of the wheel.

For co-operation with the two stationary contact members of the automatically controlled circuit closers I employ a single unit mounted in the interior and lower portion of the hollow hub H, which hub is preferably of insulating or non-conducting material. This unit, as best seen in Figure 3 comprises a base member in the shape of an annular band 1 of conducting metal, which is rigidly fixed against the inner face of the hollow hub H, and encircles the tubular post P. The base member is fashioned with an integral bracket arm 2 projecting inwardly of the band, and this arm has an integral head 3 fashioned with spaced contact heads 4 and 5. The head, with its contact members, extends concentrically with the annular band, and the contact member 4 projects upwardly from the plane of the head for use with the left hand switch and circuit closer, while the contact member 5 projects downwardly for use with the right hand switch and circuit closer.

Two stationary conductors or contact members, for the right and left hand automatic circuit closers, are mounted on the tubular post, within the hollow hub, one above the rotary head and its integral contact members, and the other below this unit. Each unit for the stationary contact member comprises a ring, as 6 and 7, of non-conducting or insulating material fixed on the exterior of the post P, and as these units are duplicates, the description of one will suffice for both, it being understood that the contact member 5 co-acts with the obverse side of the lower unit 7, and the upper contact member 4 co-acts with the reverse side of the upper stationary unit 6.

On the exterior of the insulating rings 6 and 7 is mounted a conducting ring 8, and the two contact members 4 and 5, preferably of resilient material, ride in frictional contact with these conductor rings while the annunciators are being illuminated as the steering wheel is turned. Each insulating ring 6 and 7 is also provided with an annular flange 9 spaced exterior of the conducting ring 8, and between the conductor ring and the concentric insulating flange 9 a track is provided for guiding the rotary contact member 4 or 5 as the case may be.

The track-forming flange of non-conducting material, which also is resilient or elastic has an open mouth 10 the full width of the track, while the other end of the flange terminates in a resilient frog 11 that is split from the body of the insulating flange and the free end of this frog lies against the outer face of the conducting ring 8, as seen in Figure 5. When assembled, the concentric head 3 stands between the two stationary contact units and the two contact members 4 and 5 stand outside of the two frogs and spaced circumferentially from the mouths 10 of the annular tracks. This circumferential spacing of the contact members 4 and 5 from the mouths 10 of the tracks permits of a slight turning movement of the steering wheel without closing either of the automatically closed circuit makers, but a decided or substantial turn of the steering wheel causes one of the contact members 4 or 5 to enter the open mouth 10 and ride in frictional contact with the conducting ring 8. The other contact member of head 3, however, encounters the free end of the frog 11, and this contact member, riding around on the insulating flange 9 is inoperative to close a circuit. It will be understood that, for instance, when the member 4 enters the track to indicate a left turn through the instrumentality of the upper circuit closer, the member 5 rides around the frog 11 of the lower stationary unit 7, of the circuit closer, and vice versa.

In Figure 1 it will be seen that the wire 12, which is connected to the left-turn or upper stationary unit 6, extends down through the tubular post to the annunciator, where it is grounded, and the wire 13 from the stationary unit 7 follows wire 12 to the annunciator and is grounded.

The rotary of movable unit of the automatic circuit closers is grounded through wire 14 to the frame of the vehicle, and of course a source of eelctrical supply is included in the circuits. In Figure 2, the wire 15 (dotted in Fig. 1) is shown from the spring pressed button of switch L and the wire 16 is connected to the spring pressed button R, the button-switch L being grounded at 15' in Fig. 1. These wires 15 and 16 are each connected to a spring pressed brush 17 and each of these brushes presses against a conductor ring 8, so that each switch circuit includes a switch as R and L with suitable grounds, and source of electrical supply. The brushes, of course, engage against the exterior faces of the conductor rings 8 regardless of the position of the brushes.

Having thus fully described my invention, what I claim as new and desire to secure by Letters Patent is:—

1. The combination with the hollow hub of a steering wheel a rotary head rigid therewith, an integral upwardly projecting contact member on the head, and an integral downwardly projecting contact member, said contact members being spaced within the head and of resilient material, of a tubular post having stationary contact units thereon located above and below the head, said units each having annular track-ways on adjoining faces for co-action with said contact members, and means for disconnecting one contact member from its stationary unit while the other contact member is connected with its stationary unit.

2. The combination with the hollow hub of a steering wheel having an interior conductor mounted thereon, said conductor having an inwardly spaced arcuate flange of resilient material, and said flange having an upwardly projecting contact member and a downwardly projecting contact member, of an upper unit and a lower unit fixed on the steering post of a vehicle, said units each having an annular conducting track for the contact members, said tracks each terminating at one end in an open mouth, and an integral resilient frog at the other end of each track extending transversely across a trackway adjacent an open mouth.

LYDIA A. HAGLER.